United States Patent
Hanson et al.

(10) Patent No.: US 8,470,169 B2
(45) Date of Patent: Jun. 25, 2013

(54) APPARATUS FOR TREATMENT OF AQUEOUS LIQUID

(75) Inventors: Cedric Charles Hanson, Lincoln (GB); Stuart Michael Pigott, Leek (GB)

(73) Assignee: The BOC Group Limited, Guildford, Surrey (GB)

( * ) Notice: Subject to any disclaimer, the term of this patent is extended or adjusted under 35 U.S.C. 154(b) by 395 days.

(21) Appl. No.: 12/302,120

(22) PCT Filed: May 17, 2007

(86) PCT No.: PCT/GB2007/050273
§ 371 (c)(1),
(2), (4) Date: Jan. 29, 2009

(87) PCT Pub. No.: WO2007/138342
PCT Pub. Date: Dec. 6, 2007

(65) Prior Publication Data
US 2011/0073545 A1   Mar. 31, 2011

(30) Foreign Application Priority Data
May 25, 2006  (GB) .................................. 0610384.0

(51) Int. Cl.
*B01D 33/70*  (2006.01)
(52) U.S. Cl.
USPC ............................ 210/150; 210/151; 210/220
(58) Field of Classification Search
USPC ......... 210/620, 650, 652, 739, 743, 150–151, 210/220
See application file for complete search history.

(56) References Cited

U.S. PATENT DOCUMENTS

| | | | |
|---|---|---|---|
| 7,494,588 B2 * | 2/2009 | Nakamura et al. | 210/614 |
| 2003/0121852 A1 * | 7/2003 | Katsu et al. | 210/609 |
| 2004/0108268 A1 * | 6/2004 | Liu et al. | 210/605 |

FOREIGN PATENT DOCUMENTS

| | | |
|---|---|---|
| DE | 101 05 221 A1 | 8/2002 |
| EP | 0 673 885 A2 | 9/1995 |
| JP | 20040337787 A | 12/2004 |
| WO | WO 01/00307 A3 | 1/2001 |
| WO | WO 03/086987 A1 | 10/2003 |

* cited by examiner

*Primary Examiner* — Chester Barry
(74) *Attorney, Agent, or Firm* — Joshua L. Cohen (57) ABSTRACT

Aqueous liquid having an oxygen demand flows into a treatment vessel where it is treated by suspended aerobic bacterial solids in the presence of dissolved oxygen. A pressurised flow of the treated liquid passes to a clarifying membrane separator effective to separate the flow into a discharge stream of clear liquid and a pressurised recycle stream concentrated in the aerobic bacterial solids. A first oxic gas is employed to scour the membranes and is conveyed away from the membrane separator in the pressurised recycle stream. The pressurised recycle stream is returned to under the surface of the liquid in the treatment vessel. A second oxic gas is introduced either into the pressurised recycle stream or into a further pressurised stream of aqueous liquid flowing into the same volume. The rate of introduction of the oxic gases is controlled with reference to the pH and dissolved oxygen concentration of the liquid in the vessel.

1 Claim, 3 Drawing Sheets

APPARATUS FOR TREATMENT OF AQUEOUS LIQUID

BACKGROUND OF THE INVENTION

This invention relates to a method and apparatus for the treatment of aqueous liquid having an oxygen demand.

Conventional waste water treatment is carried out in a vessel by aerobic bacterial solids that degrade organic contaminants in the water in the presence of oxygen. The water in the vessel is agitated to keep the bacterial solids in suspension. Aeration of the water maintains the necessary aerobic conditions.

On a conventional waste water treatment plant there is generally a continuous flow of water to be treated into the vessel and a continuous flow of treated water containing bacterial solids out of the vessel. The outward flow of treated water is directed from the treatment vessel to a settling tank in which the solids settle out under gravity, leaving a clear supernatant liquid that can be continuously discharged to the environment or for further treatment.

It has been proposed to do away with settlement under gravity and employ cross flow membrane filtration to separate the bacterial solids from the water. One potential advantage of membrane filtration is that it can successfully handle higher concentrations of bacterial solids than gravity separation. As a result stronger aqueous waste materials can be treated. The 'strength' of an aqueous waste material is reflected by its Biological Oxygen Demand (BOD) or its Chemical Oxygen Demand (COD), or both.

So far to date, it has proved difficult to obtain the maximum benefit from tubular cross flow membrane filters in a waste water treatment process. Difficulties arise in keeping the membrane's inner bore surfaces clean and therefore in exploiting their potential ability to handle high strength solid concentrations. These former difficulties can be mitigated by scouring the inner bore surfaces with bubbles of air as in WO01/00307A. However the scouring method described is in isolation without there being any attempt to integrate such scouring into a total aqueous liquid treatment process, the main challenge being to maintain suitable treatment conditions in the treatment vessel.

SUMMARY OF THE INVENTION

According to the present invention there is provided a method for the treatment of aqueous liquid having an oxygen demand, comprising the steps of: receiving a flow of the liquid into a vessel; reducing the oxygen demand of a volume of the liquid in the vessel by treatment with suspended aerobic bacterial solids in the presence of dissolved oxygen; conveying from the vessel to a clarifying membrane separator a pressurised flow of treated liquid, the pressurised flow containing suspended aerobic bacterial solids, and the membrane separator containing an arrangement of membranes capable of clarifying the pressurised flow; separating said pressurised flow by means of the membrane separator into i) a pressurised recycle stream concentrated in the aerobic bacterial solids and ii) a discharge stream of clear liquid; scouring the membranes with a first oxic gas, selected from oxygen and air and mixtures thereof, the first oxic gas being conveyed away from the membrane separator in the pressurised recycle stream; returning the pressurised recycle stream to under the surface of the volume of liquid in the vessel, the recycle stream thereby providing at least some of the oxygen that is dissolved therein; introducing a second oxic gas selected from oxygen and air and mixtures thereof into the pressurised recycle stream and/or into a further pressurised stream of the aqueous liquid flowing into the said volume, and controlling the total rate of introduction of the first and second oxic gases with reference to the pH and the dissolved oxygen concentration of the said volume of aqueous liquid or to parameters related thereto.

The invention also provides an apparatus for the treatment of aqueous liquid having an oxygen demand, comprising, a treatment vessel for receiving a flow of the aqueous liquid having an oxygen demand, a means for dissolving oxygen into said liquid in the presence of aerobic bacteria to reduce the oxygen demand of a volume of said liquid, a means for conveying a pressurised flow of treated liquid, containing aerobic bacterial solids, from the vessel along a conduit to a membrane separator capable of clarifying said treated liquid into a pressurised recycle stream, concentrated in aerobic bacterial solids, and a discharge of clear liquid, means for introducing a first oxic gas, selected from oxygen and air and mixtures thereof, into said membrane separator to scour said membrane separator, a conduit for conveying said pressurised recycle stream and said first oxic gas back to under the surface of the volume of aqueous liquid having oxygen demand in the vessel, means for introducing a second oxic gas, selected from oxygen and air and mixtures thereof, into the conduit for conveying said pressurised recycle stream and said first oxic scouring gas back to under the surface of the volume of aqueous liquid having oxygen demand in the vessel and/or into a conduit for conveying a further pressurised stream of the aqueous liquid flowing into the said volume of aqueous liquid having oxygen demand in the vessel and a means for controlling the total rate of introduction of the first and second oxic gases with reference to the pH and the dissolved oxygen concentration of the said volume of aqueous liquid or to parameters related thereto.

The oxygen demand may be a chemical oxygen demand (COD) or a biological or biochemical oxygen demand (BOD), or both.

The use of oxic gas, preferably oxygen, both to scour the membrane separator and oxygenate the water to be treated makes possible effective treatment of waste aqueous liquid having a high BOD and/or COD. For example, high strength waste waters with CODs in the region of 1000 mg/l and above and BODs in the region of 500 mg/l and above may be treated. Further, using the same source or sources of oxic gas for both scouring and oxygenating can reduce the total amount of gas and apparatus needed for the operation of both the treatment and clarification stages of the method according to the invention.

Preferably, the mole fraction of molecular oxygen in the first and/or second oxic gas is varied with reference to the pH and/or dissolved oxygen concentration of the volume of liquid. The variation in the mole fraction may simply be effected by substituting air for oxygen, or vice versa, or by changing the proportions of air and oxygen in a mixture thereof.

Preferably in the method according to the invention bubbles of the first and second oxic gases are formed in the pressurised aqueous liquid stream or streams, the stream or streams being under a sufficient pressure and at a sufficient velocity to have sufficient energy that when said stream or streams enters the volume of liquid in the vessel the bubbles of said oxic gas shear into smaller bubbles that either dissolve or are consumed within the volume of liquid. Such a high pressure, typically 2 to 7 bar absolute, facilitates effective scouring of the membranes and the achievement of high oxygenation efficiencies. It is advantageous to use the pressurised recycle stream as the stream into which the second oxic gas is introduced, thereby obviating or reducing the need for a separate stream of pressurised water to be introduced into the volume of water in the vessel. The choice of the pressure of the treated flow of liquid is sufficient to facilitate the transportation of clear liquid across the membrane, whilst leaving the recycle stream with sufficient pressure for the release of energy that occurs to cause the shearing of the oxic gas bubbles when the pressurised stream or streams containing oxic gas are introduced back into the volume of liquid in the vessel through one or more nozzles.

Preferably in the method according to the invention the introduction of the pressurised recycle stream or streams into the volume of the liquid in the vessel causes sufficient agitation to keep the bacterial solids in suspension and assists in the distribution of oxygen throughout the volume of liquid in the vessel, which is advantageous in its reduction of the need for further apparatus, such as mechanical stirrers, to cause said agitation.

It is preferred that the flow of treated liquid be pressurised by means of a pump that is able to pressurise the liquid to such a high pressure as to facilitate the transportation of clear liquid across the membrane, whilst leaving the pressurised recycle stream or streams with sufficient pressure for the release of energy that occurs to cause the shearing of the gas bubbles.

In order for the bacteria to flourish and reduce the oxygen demand of the waste water, it is advantageous to control both the dissolved oxygen content and pH of the volume of the liquid in the vessel. This is preferably achieved by varying the rate of supply of oxic gas to the treated flow of liquid or the pressurised recycle stream or streams, and/or varying the mole fraction of oxygen in the oxic gas.

The flow rate of oxic gas to the membrane separator can be varied within the operating parameters of the specific cross flow membrane in use. So it will not always be possible to supply sufficient oxic gas upstream of the membrane separator to meet the sensed demands of the liquid in the vessel without sacrificing the clarifying ability of the membrane separator. Therefore, a second oxic gas is supplied to the pressurised recycle stream, or to a separate pressurised stream of water.

The total rate of supply of first and second oxic gas is preferably varied in relation to the sensed instantaneous dissolved oxygen concentration of the volume of aqueous liquid in the vessel. In addition, the relative flows of the first flow of oxygen and the second flow of air are preferably varied in relation to the sensed instantaneous dissolved oxygen concentration. For example more oxygen and less air can be supplied at a low dissolved oxygen concentration and less oxygen and more air can be supplied at a higher dissolved oxygen concentration. The flow rate of the first oxic gas and its oxygen mole fraction may, however, be kept constant. In this case, the flow rate of an oxygen mole fraction in the second oxic gas are varied.

The total rate of supply of the first and second oxic gases may also be varied depending on the pH of the volume of aqueous liquid in the vessel. The $CO_2$ formed by the bacterial treatment of carbonaceous constituents in the waste water dissolves in the water producing carbonic acid, which causes the pH of the water to be lowered. Most aerobic bacterial solids cannot tolerate pH values lower than 5.5. The relative rates of flow of the first flow of oxygen and the second flow of air may be varied with reference to the pH of the said volume of aqueous liquid in the vessel.

Preferably the volume of liquid in the vessel is maintained at or below pH 7, although the pH may be allowed to rise as high as 8 depending on the composition of the aqueous liquid, more preferably it is maintained between pH 6.0 and pH 7.0, particularly between pH 6.9 and pH 6.5. Such pH values are high enough to enable oxygen to dissolve in the liquid, protect the bacterial solids and constantly remove and prevent the build up of scale on the membrane surface that occurs due to the deposition of minerals in the waste water, which are not removed by scouring.

Each membrane preferably has a bore with an inner porous face and an outer porous face, there being a gradient of increasing pore diameter from the inner to the outer porous face, in contact with the pressurised flow of treated liquid, to the outer porous face, where the clear liquid exits the membranes. The inner face pore size is preferably small enough to prevent the bacterial solids from passing across the membrane. An example of such a system is that disclosed in WO01/00307A, which uses tubular polyethersulfone membranes with an increasing pore diameter gradient from the inner bore surface of the tube to the outer wall. It is not essential, however, for the membranes to be tubular.

Heat generated in the treatment is usually lost by evaporation to the atmosphere. The method and apparatus according to the present invention are advantageous in that for a given inflow of waste water to be treated, a relatively small volume treatment vessel containing a high concentration of bacterial solids can be utilised, thus keeping down evaporative heat loss from the surface of the liquid. It is possible to maintain the bulk of the liquid in the treatment vessel to temperatures between 20° C. and 80° C., i.e. above ambient temperature. The temperature may be selected to be one in which mesophilic aerobic bacteria are able to degrade the organic constituents and reproduce at a higher rate, or one in which more potent thermophilic bacteria may be utilised for the water treatment. At higher temperatures, e.g. 60° C. and above, it may also be possible to destroy pathogens such as e-coli and salmonella. Heating or cooling from an external source may be provided so as to control the temperature of the aqueous liquid in the treatment vessel.

BRIEF DESCRIPTION OF THE DRAWINGS

The method and apparatus according to the invention will now be described by way of example, with reference to the accompanying drawings, in which.

The drawings are not to scale.

DESCRIPTION OF THE INVENTION

Like parts in different Figures are referred to below by the same reference numeral. The use of the Suffix A denotes an element particularly adapted for the introduction of oxygen and the Suffix B denotes an element particularly adapted for the introduction of air.

Figure 1:
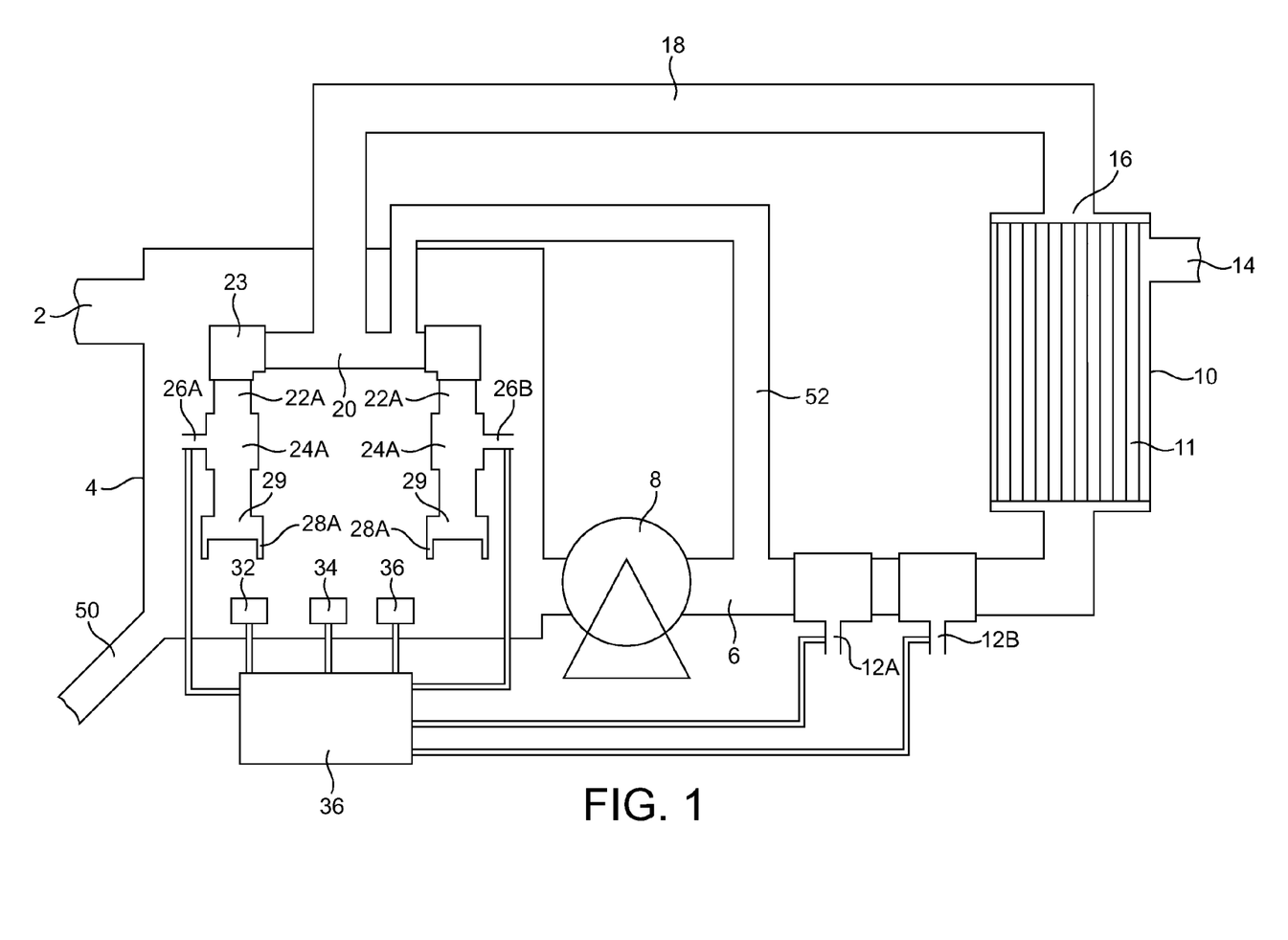
FIG. 1 is a schematic flow diagram of the apparatus for performing the method according to the invention.

Referring to FIG. 1, a flow of aqueous liquid having a varying oxygen demand is conveyed continuously to an inlet 2 in the side of an open treatment vessel 4. The vessel 4 may be of any convenient capacity. Typically, it holds from 50 to 5000 m3 of liquid. Typically, the depth of the liquid in the vessel 4 is in the range 3 to 15 metres. The liquid can be, for example, domestic or industrial waste water having a BOD and/or a COD, the magnitude of the oxygen demand being dependent on the concentration and nature of the organic or chemical pollutants present therein. For example strong untreated domestic waste water may have a BOD of 400 mg/l and a COD of 1000 mg/l. The waste water typically contains aerobic bacteria, which in the presence of dissolved molecular oxygen break down the pollutants and reduce the oxygen demand of the water. If such bacteria are not present, the waste water can be seeded with them.

The oxygen demand of the wastewater is reduced in the vessel by aerobic treatment with suspended aerobic bacterial solids in the presence of dissolved oxygen according to the general formula 1:

Organic matter+$O_2$+bacteria+nutrients→$CO_2$+bacteria+other end products          Formula 1

As well as the products shown in Formula 1, energy in the form of heat is released, which raises the temperature of the waste water in the vessel 4. The bacterial solids used for the treatment can comprise either mesophilic or thermophilic bacteria. The populations and growth rates of these bacteria vary with temperature. Accordingly the temperature of the aqueous liquid in the treatment vessel 4 may be controlled. Typically, cooling may be provided to the vessel 4 for this purpose. If the temperature of the waste water in the treatment vessel is between 20° C. and 50° C., mesophilic bacteria predominate, for which a temperature of 20° C. to 35° C. is preferable. If the temperature in the treatment vessel is between 35° C. and 75° C. thermophilic bacteria predominate, for which a temperature of between 40° C. to 60° C. is preferable. Water in the vessel 4 is agitated so as to keep bacterial solids in suspension. For the bacteria to flourish, a sufficient concentration of dissolved oxygen is needed. In conventional waste water treatment aeration is the sole source of dissolved oxygen. Aeration, however, imposes limitations on the treatment process making it difficult to handle effluents with high oxygen demands.

A flow of treated waste water, with reduced oxygen demand and containing aerobic bacterial solids is continually drawn from outlet 3, near the base of vessel 4, and is pressurised to between 2 to 7 bar absolute by a pump 8. The pressurised flow is conveyed along a conduit 6, typically formed of PVC or HDPE (high density polyethylene), by a pump 8 to a clarifying membrane separation unit 10. The separation unit 10 preferably contains an arrangement of tubular clarifying cross flow type membranes 11. The membranes are typically constructed with a low pressure drop, in the region of 0.5 to 1 bar absolute. Such a pressure drop may be achieved by forming the tubular membranes from materials such as polyethersulphone with an increasing pore diameter gradient from the inner bore surface of the tube to the outer wall. The pressurised flow entering the membrane separation unit 10 passes into the inner bore of the membranes 11 and is separated into i) a pressurised recycle stream, concentrated in bacterial solids, which passes through the inner bore of the membranes 11 and exits the separation unit 10, via outlet 16, and ii) a discharge stream of clear liquid, which passes across the membrane and exits the separation unit 10 via outlet 14. Suitable membrane separation units are widely commercially available.

The clear stream exiting the membrane separation unit 10 at outlet 14 may require further treatment to remove pathogens not removed by either the aerobic treatment or separation stages, such as viruses, *e-Coli* and *salmonella*.

The separation of the pressurised flow leaves deposits of bacterial solids on the inner bore surface of the membranes 11, which left untreated would increase the pressure drop of said membranes 11. A first oxic gas, selected from oxygen and air and mixtures thereof, is introduced into the pressurised flow upstream of the separator unit 10 at inlets 12A or 12B respectively. In one arrangement oxygen is supplied to the inlet 12A and air to the inlet 12B. The first oxic gas forms bubbles, sometimes referred to as 'Taylor' bubbles, at the mouth of the inner bore of tubular membranes 11. Oxygen may be supplied from, for example, from a plant (not shown) for separating air by, for example, pressure swing adsorption or from a storage vessel (not shown) containing liquid oxic gas and fitted with an evaporator whereby the oxic gas may be supplied to the inlet 12A in the gaseous state. Air may be supplied from an air blower or compressor (not shown) to the inlet 12B. As the Taylor bubbles travel up the inner bores of membranes 11 they cause turbulence in their immediate wake that scours, i.e. cleans, the surfaces of the membranes 11 by disrupting the bacterial solids accumulated on the surface of the inner bore. The first oxic scouring gas passes through the inner bore of the membranes 11 and is therefore carried out of the separation unit 10 via outlet 16 by the pressurised recycle stream.

The pressurised recycle stream containing bubbles of the scouring gas passes through conduit 18. The conduit 18 is typically formed of PVC or HDPE (High Density Polyethylene) tubing with an internal diameter of 200 mm (8 inches). The conduit 18 may also contain a turbulence-creating configuration, such as a restricting orifice, to prevent or limit coalescence of the scouring gas bubbles into separate pockets of gas. It is also advantageous to minimise the length of conduit 18 between the outlet 16 and conduit 20 to prevent the bubbles from coalescing. The pump 8 pressurises the treated flow, conveyed along conduit 6, sufficiently for the recycle stream exiting the membrane separation unit 10 to pass through conduit 18 at a velocity of at least 4-6 m/s.

Figure 2:
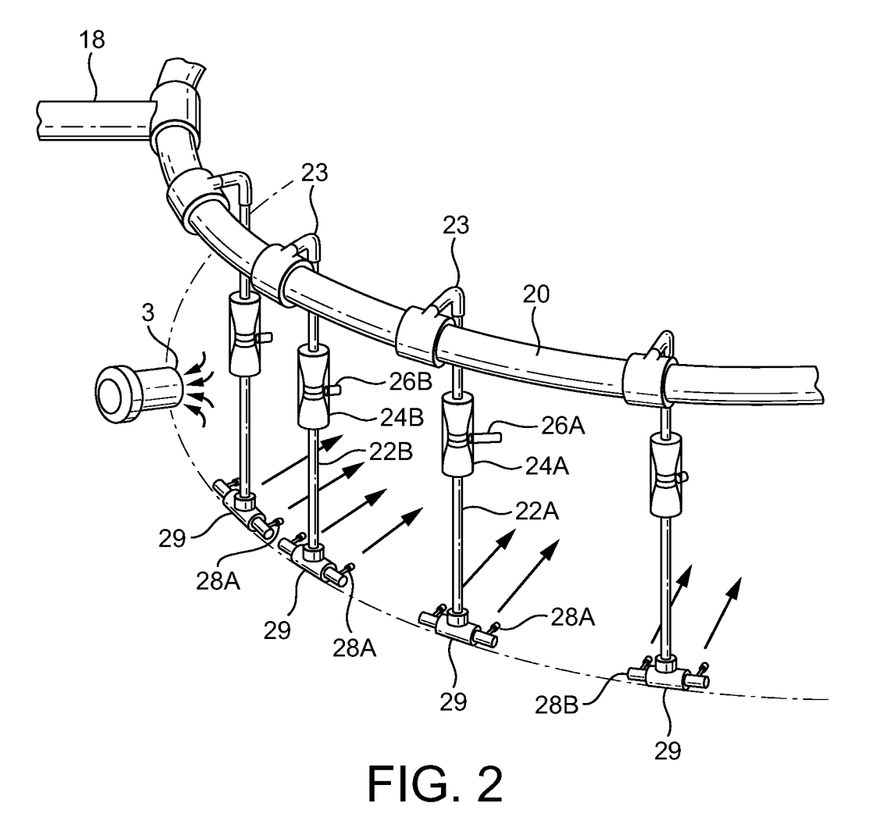
FIG. 2 is a schematic drawing, partly in perspective, of a section of the aeration apparatus in the treatment vessel according to the invention.

With reference to FIG. 2, conduit 20 may take the form of a ring main which, if desired, may be submerged in the volume of the liquid in vessel 4. The pressurised stream enters conduit 20, formed of similar materials and dimensions to conduit 18, at a velocity that is sufficient to prevent the build up of bacterial solids in the conduit 20, for example in the range 0.6 m/s and 1.2 m/s. The conduit 20 is adapted to feed the pressurized stream to a plurality or multiplicity of spaced subsidiary conduits 22A, 22B which depend generally vertically therefrom, each such conduit being formed with an upstream elbow 23 contiguous to the conduit 20. Each conduit 22A,22B is typically less than five metres in length (but can be more or less, depending on the depth of the vessel 4) and of a diameter of between 75 and 50 mm. Each subsidiary conduit 22A,22B may have a second oxic gas introducing venturi 24, shown in more detail in FIG. 3, disposed therein at an upper region thereof. Each venturi 24A,24B has an inlet 26 for the introduction of a second oxic gas, either air or oxygen. The inlets 26A are dedicated to oxygen, typically being connected to the same oxygen main used to supply the oxygen to the inlet 12A and the inlets 26B are dedicated to air, typically being connected to the same air main used to supply air to the inlet 12B. Preferably, there is an arrangement of valves which enables either oxygen or air to be supplied at any one time, or both together. A suitable configuration for the venturi 24 is shown in FIG. 3.

Figure 3:
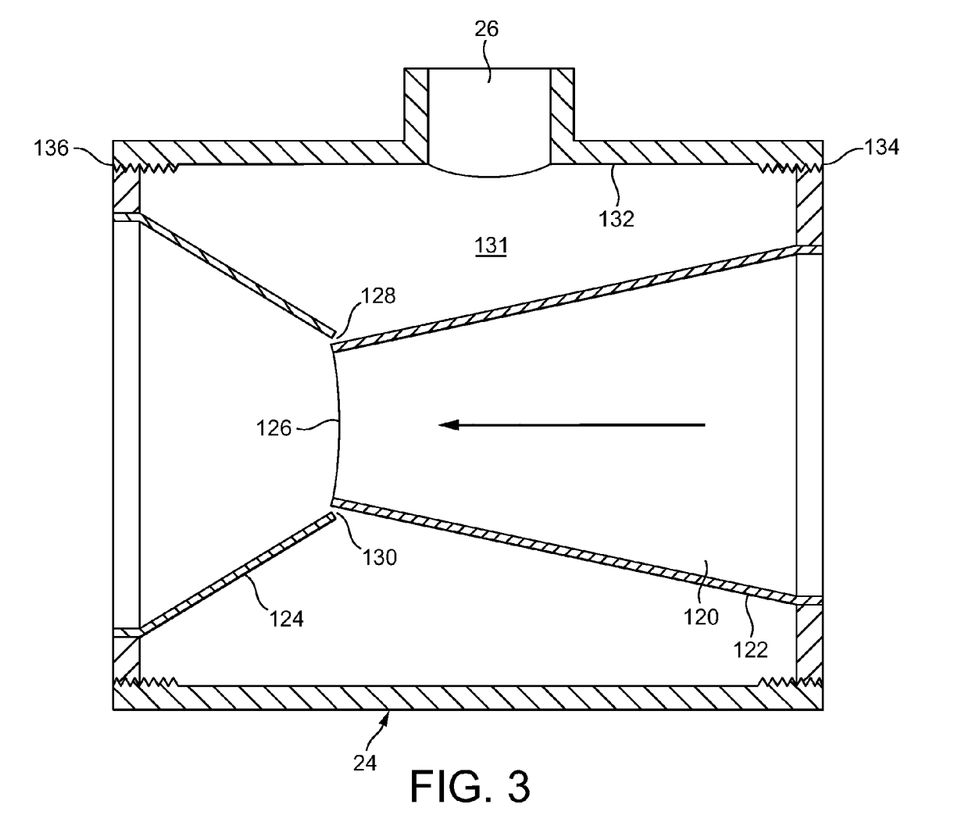
FIG. 3 is a sectional elevation view of a preferred form of a gas introducing venturi device for use in embodiments of the invention.

With reference to FIG. 3, the venturi 24 comprises a duct 120 formed by a first generally convergent section such as, for example, truncated cone 122 and a second generally divergent section 124 (the flow of the pressurized stream through the venturi in FIG. 3 being from right to left, as indicated by the arrow). The first section is provided with a narrower outlet end 126 than the inlet end 128 of the second section 128 and the two overlap so as to define an annular gap 130 therebetween. A plenum chamber 131 formed by a wall portion (in the form of, for example, a right circular tube 132 extending between the first and second sections 122, 124) and the sections 122, 124 is provided for receiving gas via inlet 26 and for directing it to and through the annular gap 130_for dissolution in the pressurized stream flowing through duct 120. First and second sections 122, 124 are axially movable with respect to tube 132, by way of screw threads 134, 136, so as to vary the size of annular gap 130 and thus the cross-sectional area through which gas is able to flow. Operation of venturi 24 is described in EP 673885 B1.

Referring again to FIG. 2, each conduit 22A,22B has a downstream T-piece pipe 29 at its bottom end in which is received one or more outlet nozzles 28A,28B for passing liquid-gas mixture into the volume of liquid in vessel 4. Each nozzle 28A, 28B has an outlet diameter typically in the range of 10 to 45 millimeters, i.e. much smaller than that of the diameter of the associated conduit 22A,22B whereby the liquid-gas mixture leaves the nozzle at a high velocity hereby creating turbulence, helping further to break up or shear bubbles of oxic gas in the mixture into even smaller bubbles that are readily consumed by or dissolve in the main body of liquid, providing intimate mixing thereof, and providing agitation for the main body of liquid. Typically, sufficient number of nozzles 28A,28B are provided for an adequate degree of agitation to be maintained within the main vessel without the need to resort to additional mechanical agitators. The nozzles 28A,28B typically direct the liquid radially inwards. This configuration offers the oxic gas bubbles long residence times in the liquid within the vessel 4 and helps to keep down the amount of oxygen lost to the atmosphere.

The apparatus shown in FIG. 1 may, for example, be used to treat and clarify 1000 m³ of waste water a day or multiples thereof, with an aerobic bacterial solids concentration of up to 40 kg/m3, typically dissolve up to 5 tonnes per day or multiples thereof of oxygen, and mix, a volume of up to 5000 m3 or multiples thereof of a waste water with a BOD of up to 25000 mg/l, and a COD of up to 50000 mg/l, employing a pump 8 capable of conveying between 1000-2000 m³ per hour of water around the apparatus at a pressure of approximately 2 -7 bar absolute.

A plurality of dissolved oxygen (DO) monitoring devices 34 and pH monitoring devices 32 are provided within the volume of the liquid in vessel 4 (single devices indicated in FIG. 1, but multiple devices may be used). Both devices 32 and 34 are connected to a control device 36, which can be, for example, a microprocessor or programmable logic controller device. The device 36 is also connected to gas inlets 12A and 12B upstream of the membrane separator 10 and additional gas inlets 26A and 26B. It would also be suitable for the devices 32 and 34 to be situated in conduit 6.

As the strength of the aqueous liquid in vessel 4 increases, the DO levels sensed by device 34 will fall as the aerobic bacteria consume oxygen in the degradation of the organic constituents according to Formula 1 above. In order for the bacteria to flourish the demand for oxygen must be fulfilled. At a predetermined set point of DO or oxygen demand the control device 36 actuates gas inlet 12A to increase the flow rate of first oxic gas, typically oxygen, supplied upstream of the membrane separator 10. If the sensed oxygen demand is high enough the oxic gas flow rate supplied by inlet 12A may reach a limit that the separator 10 is able to cope with before its ability to separate the pressurised flow is compromised. In this case, the control device 36 actuates gas inlet 26A to supply additional oxic gas to the pressurised stream in conduit 22A to replenish the oxygen needed by the aerobic bacteria in vessel 4.

Conversely, when the waste water has been treated, or is of low strength, the DO levels will rise and thus the sensed instantaneous demand in the vessel will fall. In this case the control device 36 will either decrease the oxygen flow rate from inlets 12A and 26A or actuate inlets 12B and 26B to dilute, or replace, the oxygen with air to reduce plant running costs.

It is also preferable to submerge a temperature sensor 38 into the volume of liquid in vessel 4, or conduit 6, that in combination with control device 36 allows for the variation in oxygen solubility with temperature and thus alter the flow rate and/or proportion of air and oxygen supplied to the pressurised stream or streams accordingly. The temperature sensor 38 may also be used to control the provision of cooling (or heating) to the vessel 4 so as to maintain the temperature therein at a closer value or within a closer range.

$CO_2$ formed in the degradation of the organic constituents according to Formula 1 dissolves in the water to form carbonic acid which can adversely affect the aerobic bacteria. The device 32 is employed together with device 36 to monitor and manage the pH, and also therefore carbonic acid/free Co2 levels, in the water. In use, when device 32 senses a pH lower than 6.5 the water must be degassed, thus control device 36 actuates to gas inlets, 12B or 26B to introduce air to the pressurised flow of treated liquid and/or pressurised stream respectively. The addition of air causes the degassing or stripping of the volume of the liquid in vessel 4. When the pH has risen to around 6.9 device 36 actuates gas inlets 12B or 26B to reduce the flow rate of air. Maintaining the pH between 6.5 and 6.9 is preferred because it is both high enough to protect the bacterial solids and allow oxygen to dissolve, whilst providing a mildly acidic pressurised flow of treated liquid from vessel 4 to prevent and remove scale formed on the surface of the membrane tubes 11.

There are a number of alternative control strategies to those outlined above. The chosen control strategy may depend on the "strength" of the water to be treated. In general it will not be possible adequately to treat strong effluent with the sole source of oxic gas being that supplied upstream of the membrane separator 10. Instead it will be desirable to supply a second oxic gas to the pressurised stream in conduit 22 for part or all of the treatment. It also has to be born in mind that one of the advantages of membrane clarification over clarification by natural settlement under gravity is that the former permits higher concentrations of suspended bacterial solids to be used in the treatment vessel 4. As a consequence, the treatment in the vessel 4 can be intensified relative to a conventional treatment with a concomitant increase in oxygen demand by the aqueous waste being treated and a greater rate of formation of carbon dioxide. The method and apparatus according to the invention may supply the necessary oxygen not only through the first oxic gas but also through the second oxic gas. Further the second oxic gas can be selected according to the sensed instantaneous pH and dissolved oxygen concentration of the waste water in the vessel 4. If the pH is at an acceptable value, say, no lower than 6.5, oxygen may be supplied to the conduits 22A and hence dissolved in the waste water. By use of oxygen rather than air, higher rates of transfer and/or dissolved oxygen levels can be achieved. Once the dissolved oxygen level has been increased to a chosen minimum, the supply of oxygen to the conduit 22A may be stopped or reduced and air instead supplied to the conduits 22B. Should the pH fall below a chosen minimum, say 6.5, then the rate of-air supply to the waste water in the vessel 4 is increased. So increasing the rate of supply of air increases the rate at which dissolved carbon dioxide is driven out of solution and thus increases the pH again. In the event that a low pH condition is sensed when oxygen is being supplied as the second oxic gas, the oxygen supply is stopped, and the air supply at its higher rate is commenced. Accordingly, by switching between oxygen and air as the second oxic gas, and varying its rate of supply, suitable dissolved oxygen concentrations and pH levels can be maintained in the waste water being treated. If such a control strategy is adopted, it is convenient to supply the first oxic gas at a constant rate and a constant composition.

If desired, more sophisticated control systems may be employed. For example, chosen minimum and maximum dissolved oxygen concentrations can be varied accordingly to the sensed temperature of the water to be treated. In another example, the rate of supply of oxic gas may be additionally changed in response to the rate of change in the dissolved oxygen concentrations.

Although it is advantageous to use the pressurised recycle stream as the stream into which the second oxic gas is introduced, thereby obviating the need for a separate stream of pressurised water to be introduced into the volume of water in the vessel, in certain situations, for example during maintenance of the membrane separator 10, a further pressurised stream may be conveyed along conduit 52, from the pressurised flow of treated liquid in conduit 6, to conduit 20.

It will be understood that the recycling of the bacterial solids to the vessel 4, which is an inherent feature of the method and apparatus according to the invention tends to accumulate these solids. As a result, bacterial solids are preferably discharged from the vessel 4 through an outlet 50 from time to time and the resulting sludge so discharged either incinerated or subjected to a sludge digestion or other treatment process of a kind well known in the art.

The invention claimed is:

1. An apparatus for the treatment of aqueous liquid having an oxygen demand, comprising a treatment vessel for receiving a flow of the aqueous liquid; means for dissolving oxygen into said aqueous liquid in the presence of aerobic bacteria to reduce the oxygen demand of a volume of said aqueous liquid; means for pressurising and conveying a pressurised flow of treated liquid containing aerobic bacterial solids from the treatment vessel through a conduit to a membrane separator capable of clarifying said treated liquid into a pressurised recycle stream concentrated with aerobic bacterial solids, and a discharge stream of clear liquid; means for introducing a first oxic gas selected from oxygen, air and mixtures thereof into said membrane separator to scour membranes of said membrane separator; another conduit for conveying said pressurised recycle stream with said first oxic gas back to beneath a surface of the aqueous liquid in the treatment vessel; means for introducing a second oxic gas selected from oxygen, air and mixtures thereof into the conduit for conveying said pressurised recycle stream and said first oxic gas back to beneath the surface of the aqueous liquid in the treatment vessel and/or into another conduit for conveying a further pressurised stream of the aqueous liquid flowing into the aqueous liquid in the treatment vessel; and means for controlling a total rate of introduction of the first and second oxic gases to the aqueous liquid depending upon pH and a dissolved oxygen concentration of the volume of the aqueous liquid.

* * * * *

UNITED STATES PATENT AND TRADEMARK OFFICE
CERTIFICATE OF CORRECTION

Page 1 of 3

PATENT NO.      : 8,470,169 B2
APPLICATION NO. : 12/302120
DATED           : June 25, 2013
INVENTOR(S)     : Cedric Charles Hanson and Stuart Michael Pigott It is certified that error appears in the above-identified patent and that said Letters Patent is hereby corrected as shown below:

Delete the title page and substitute therefore with the attached title page consisting of corrected illustrative figure.

In the drawings, Sheet 1, FIG. 1, the reference numeral -- 38 --, not "36", should be applied to the temperature sensor element (small box) immediately to the right of element 34, as attached.

Signed and Sealed this
Twenty-fifth Day of March, 2014

Michelle K. Lee
*Deputy Director of the United States Patent and Trademark Office*

(12) United States Patent
Hanson et al.

(10) Patent No.: US 8,470,169 B2
(45) Date of Patent: Jun. 25, 2013

(54) APPARATUS FOR TREATMENT OF AQUEOUS LIQUID

(75) Inventors: Cedric Charles Hanson, Lincoln (GB); Stuart Michael Pigott, Leek (GB)

(73) Assignee: The BOC Group Limited, Guildford, Surrey (GB)

(*) Notice: Subject to any disclaimer, the term of this patent is extended or adjusted under 35 U.S.C. 154(b) by 395 days.

(21) Appl. No.: 12/302,120

(22) PCT Filed: May 17, 2007

(86) PCT No.: PCT/GB2007/050273
§ 371 (c)(1), (2), (4) Date: Jan. 29, 2009

(87) PCT Pub. No.: WO2007/138342
PCT Pub. Date: Dec. 6, 2007

(65) Prior Publication Data
US 2011/0073545 A1 Mar. 31, 2011

(30) Foreign Application Priority Data
May 25, 2006 (GB) .................. 0610384.0

(51) Int. Cl.
*B01D 33/70* (2006.01)
(52) U.S. Cl.
USPC .................. 210/150; 210/151; 210/220
(58) Field of Classification Search
USPC .......... 210/620, 650, 652, 739, 743, 150–151, 210/220
See application file for complete search history.

(56) References Cited

U.S. PATENT DOCUMENTS

| | | | |
|---|---|---|---|
| 7,494,588 B2* | 2/2009 | Nakamura et al. | 210/614 |
| 2003/0121852 A1* | 7/2003 | Katsu et al. | 210/609 |
| 2004/0108268 A1* | 6/2004 | Liu et al. | 210/605 |

FOREIGN PATENT DOCUMENTS

| | | |
|---|---|---|
| DE | 101 05 221 A1 | 8/2002 |
| EP | 0 673 885 A2 | 9/1995 |
| JP | 20040337787 A | 12/2004 |
| WO | WO 01/00307 A3 | 1/2001 |
| WO | WO 03/086987 A1 | 10/2003 |

* cited by examiner

*Primary Examiner* — Chester Barry
(74) *Attorney, Agent, or Firm* — Joshua L. Cohen (57) ABSTRACT

Aqueous liquid having an oxygen demand flows into a treatment vessel where it is treated by suspended aerobic bacterial solids in the presence of dissolved oxygen. A pressurised flow of the treated liquid passes to a clarifying membrane separator effective to separate the flow into a discharge stream of clear liquid and a pressurised recycle stream concentrated in the aerobic bacterial solids. A first oxic gas is employed to scour the membranes and is conveyed away from the membrane separator in the pressurised recycle stream. The pressurised recycle stream is returned to under the surface of the liquid in the treatment vessel. A second oxic gas is introduced either into the pressurised recycle stream or into a further pressurised stream of aqueous liquid flowing into the same volume. The rate of introduction of the oxic gases is controlled with reference to the pH and dissolved oxygen concentration of the liquid in the vessel.

1 Claim, 3 Drawing Sheets

FIG. 1